(12) United States Patent
Sung

(10) Patent No.: US 11,731,557 B2
(45) Date of Patent: Aug. 22, 2023

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Kijun Sung, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 325 days.

(21) Appl. No.: 17/122,719

(22) Filed: Dec. 15, 2020

(65) Prior Publication Data

US 2022/0024373 A1 Jan. 27, 2022

(30) Foreign Application Priority Data

Jul. 22, 2020 (KR) ........................ 10-2020-0090818

(51) Int. Cl.
| | |
|---|---|
| *B60W 30/09* | (2012.01) |
| *B60Q 1/24* | (2006.01) |
| *G01C 21/36* | (2006.01) |
| *B60W 50/14* | (2020.01) |

(52) U.S. Cl.
CPC ............. *B60Q 1/24* (2013.01); *B60W 30/09* (2013.01); *B60W 50/14* (2013.01); *G01C 21/365* (2013.01); *B60Q 2400/50* (2013.01); *B60W 2050/146* (2013.01); *B60W 2552/30* (2020.02); *B60W 2554/802* (2020.02); *B60W 2710/18* (2013.01)

(58) Field of Classification Search
CPC ...... B60Q 1/24; B60Q 2400/50; B60Q 1/525; B60Q 9/008; B60Q 9/002; B60W 30/09; B60W 50/14; B60W 2050/146; B60W 2552/30; B60W 2554/802; B60W 2710/18; B60W 2050/0075; B60W 2710/09; B60W 2556/50; B60W 40/072; B60W 40/105; G01C 21/365
See application file for complete search history.

(56) References Cited

U.S. PATENT DOCUMENTS

| | | | | |
|---|---|---|---|---|
| 8,958,986 | B2 * | 2/2015 | Kagawa | B62D 15/0275 180/199 |
| 2003/0147247 | A1 * | 8/2003 | Koike | B60Q 9/004 362/464 |
| 2010/0066515 | A1 * | 3/2010 | Shimazaki | H04N 7/18 701/41 |

(Continued)

FOREIGN PATENT DOCUMENTS

KR 10-2017-0070514 A 1/2018

*Primary Examiner* — Jason Holloway
(74) *Attorney, Agent, or Firm* — Slater Matsil, LLP

(57) ABSTRACT

A vehicle is provided. The vehicle includes: a global navigation satellite system (GNSS) receiver configured to receive a signal from a GNSS; a guide lamp installed on a front portion of the vehicle; and a controller electrically connected to the GNSS receiver and the guide lamp, wherein the controller is configured to: identify an entry of the vehicle into a parking lot based on a GNSS signal acquired by the GNSS receiver; and control the guide lamp to display a light line representing a path to be travelled by the vehicle and an area to be occupied by the vehicle on a road ahead of the vehicle based on the entry of the vehicle into the parking lot.

20 Claims, 9 Drawing Sheets

(56) References Cited

U.S. PATENT DOCUMENTS

| | | | |
|---|---|---|---|
| 2013/0120572 A1* | 5/2013 | Kwon | B62D 15/0295 |
| | | | 348/148 |
| 2017/0282915 A1* | 10/2017 | Kim | B60W 30/09 |
| 2018/0004020 A1* | 1/2018 | Kunii | B60Q 1/34 |
| 2018/0345955 A1* | 12/2018 | Kim | B60R 1/00 |
| 2019/0135169 A1* | 5/2019 | Conger | B60Q 1/488 |

* cited by examiner

VEHICLE AND METHOD OF CONTROLLING THE SAME

CROSS-REFERENCE TO RELATED APPLICATION

The present application claims priority to and the benefit of to Korean Patent Application No. 10-2020-0090818, filed on Jul. 22, 2020, the disclosure of which is incorporated herein by reference in its entirety.

TECHNICAL FIELD

The present disclosure relates to a vehicle and a method of controlling the same, and more specifically, to a vehicle capable of assisting a driver in a helical road or a helical access road of a parking lot, and a method of controlling the same.

BACKGROUND

Generally, a vehicle refers to a device for transportation designed to run on a road or railway using fossil fuel, electric power, and the like as a power source.

Vehicles travel on various types of roads. For example, while a vehicle is traveling on a helical road, collisions with other vehicles or objects frequently occur due to the driver's inexperience travelling.

In particular, in the case of a helical access road of a parking lot, a path to be travelled on by a vehicle is narrow due to a median divider and/or a velocity bump, and thus minor collisions frequently occur. In addition, when a parking tollgate is located in an improper location, the risk of a vehicle accident increases. Moreover, the risk of a vehicle accident is further increasing as the width of the vehicle increases with the same width of the helical access road of the parking lot.

Meanwhile, the conventional vehicle only passively warns the driver of a collision risk, and such warnings may however cause drivers, who are inexperienced in travelling, operational errors, leading to accidents.

SUMMARY

The present disclosure provides a vehicle capable of preventing a collision in a dark or narrow parking lot access road, and a method of controlling the same.

The present disclosure also provides a vehicle capable of preventing a collision in a helical access road of a parking lot, and a method of controlling the same.

Additional aspects of the disclosure will be set forth in part in the description which follows and, in part, will be obvious from the description, or may be learned by practice of the disclosure.

It is an aspect of the disclosure to provide a vehicle including: a global navigation satellite system (GNSS) receiver configured to receive a signal from a GNSS; a guide lamp installed on a front portion of the vehicle; and a controller electrically connected to the GNSS receiver and the guide lamp, wherein the controller is configured to: identify entry of the vehicle into a parking lot based on a GNSS signal acquired by the GNSS receiver; and control the guide lamp to display, on a road, a light line representing a path to be travelled on by the vehicle and an area to be occupied by the vehicle on a road ahead of the vehicle based on the entry of the vehicle into the parking lot being identified.

The guide lamp may include: a first light source array including a plurality of light sources two-dimensionally arranged and installed on a front left portion of the vehicle to form a first light line on a front left side of the vehicle; and a second light source array including a plurality of light sources two-dimensionally arranged and installed on a front right portion of the vehicle to form a second light line on a front right side of the vehicle.

The controller may control the first and second light source arrays to form the first and second light lines having a curvature according to a travelling velocity of the vehicle and a steering angle of the vehicle, based on the entry of the vehicle into the parking lot being identified.

The vehicle may further include a camera having a field of view directed forward of the vehicle and a display configured to display a front image of an area in front of the vehicle captured by the camera, wherein the controller may control the display to display a guide line representing a path to be travelled on by the vehicle and an area to be occupied by the vehicle on the front image.

The vehicle may further include a radar having a field of sensing directed forward of the vehicle and configured to output radar data, wherein the controller may identify a time to collision between an object located in front of the vehicle and the vehicle, based on the radar data.

The controller may control the guide lamp to change a color of the light line, based on the time to collision being less than a reference time.

The guide lamp may include a first light source array configured to form a first light line on a front left side of the vehicle and a second light source array configured to form a second light line on a front right side of the vehicle, wherein the controller may control the first and second light source arrays to form the first and second light lines in a yellow or red color, based on the time to collision being less than the reference time.

The controller may control at least one of a steering device of the vehicle or a braking device of the vehicle to avoid a collision between the object located in front of the vehicle and the vehicle, based on the time to collision being less than a reference time.

The controller, based on the time to collision being less than a reference time, may control the guide lamp to change a color of the light line in a first mode and control at least one of a steering device of the vehicle or a braking device of the vehicle to avoid a collision between the object located in front of the vehicle and the vehicle in a second mode.

The vehicle may further include a camera having a field of view directed forward of the vehicle and configured to output image data, wherein the controller may be configured to: identify that the vehicle enters a curved road based on the image data; and control the guide lamp to display a light line representing a path to be travelled on by the vehicle and an area to be occupied by the vehicle on a road ahead of the vehicle, based on the entry of the vehicle into the curved road being identified.

It is another aspect of the disclosure to provide a vehicle including: a camera having a field of view directed forward of the vehicle, and configured to output image data; a guide lamp installed on a front portion of the vehicle; and a controller electrically connected to the camera and the guide lamp, wherein the controller is configured to: identify entry of the vehicle into a curved road based on the image data; and control the guide lamp to display, on a road, a light line representing a path to be travelled on by the vehicle and an area to be occupied by the vehicle on a road ahead of the vehicle based on the entry of the vehicle into the curved road being identified.

The guide lamp may include: a first light source array including a plurality of light sources two-dimensionally arranged and installed on a front left portion of the vehicle to form a first light line on a front left side of the vehicle; and a second light source array including a plurality of light sources two-dimensionally arranged and installed on a front right portion of the vehicle to form a second light line on a front right side of the vehicle.

The controller may control the first and second light source arrays to form the first and second light lines having a curvature according to a travelling velocity of the vehicle and a steering angle of the vehicle, based on the entry of the vehicle into the curved road being identified.

The vehicle may further include a radar having a field of sensing directed forward of the vehicle and configured to output radar data, wherein the controller may identify a time to collision between an object located in front of the vehicle and the vehicle, based on the radar data.

The controller, based on the time to collision being less than a reference time, may control the guide lamp to change a color of the light line in a first mode and may control at least one of a steering device of the vehicle or a braking device of the vehicle to avoid a collision between the object located in front of the vehicle and the vehicle in a second mode.

It is another aspect of the disclosure to provide a method of controlling a vehicle, the method including: identifying entry of the vehicle into a parking lot or a curved road based on position information of the vehicle or a front image of an area in front of the vehicle; and displaying, on a road, a light line representing a path to be travelled on by the vehicle and an area to be occupied by the vehicle on a road ahead of the vehicle based on the entry of the vehicle into the parking lot or the curved road being identified.

The displaying of the light line may include forming the first and second light lines having a curvature according to a travelling velocity of the vehicle and a steering angle of the vehicle, based on the entry of the vehicle into the parking lot or the curved road being identified.

The method may further include displaying a guide line representing a path to be travelled on by the vehicle and an area to be occupied by the vehicle on the front image.

The method may further include identifying a time to collision between an object located in front of the vehicle and the vehicle, based on radar data.

The method may further include, based on the time to collision being less than a reference time, changing a color of the light line in a first mode and avoiding a collision between the object located in front of the vehicle and the vehicle in a second mode.

DRAWINGS

These and/or other aspects of the disclosure will become apparent and more readily appreciated from the following description of the embodiments, taken in conjunction with the accompanying drawings of which:

DETAILED DESCRIPTION

Figure 1:
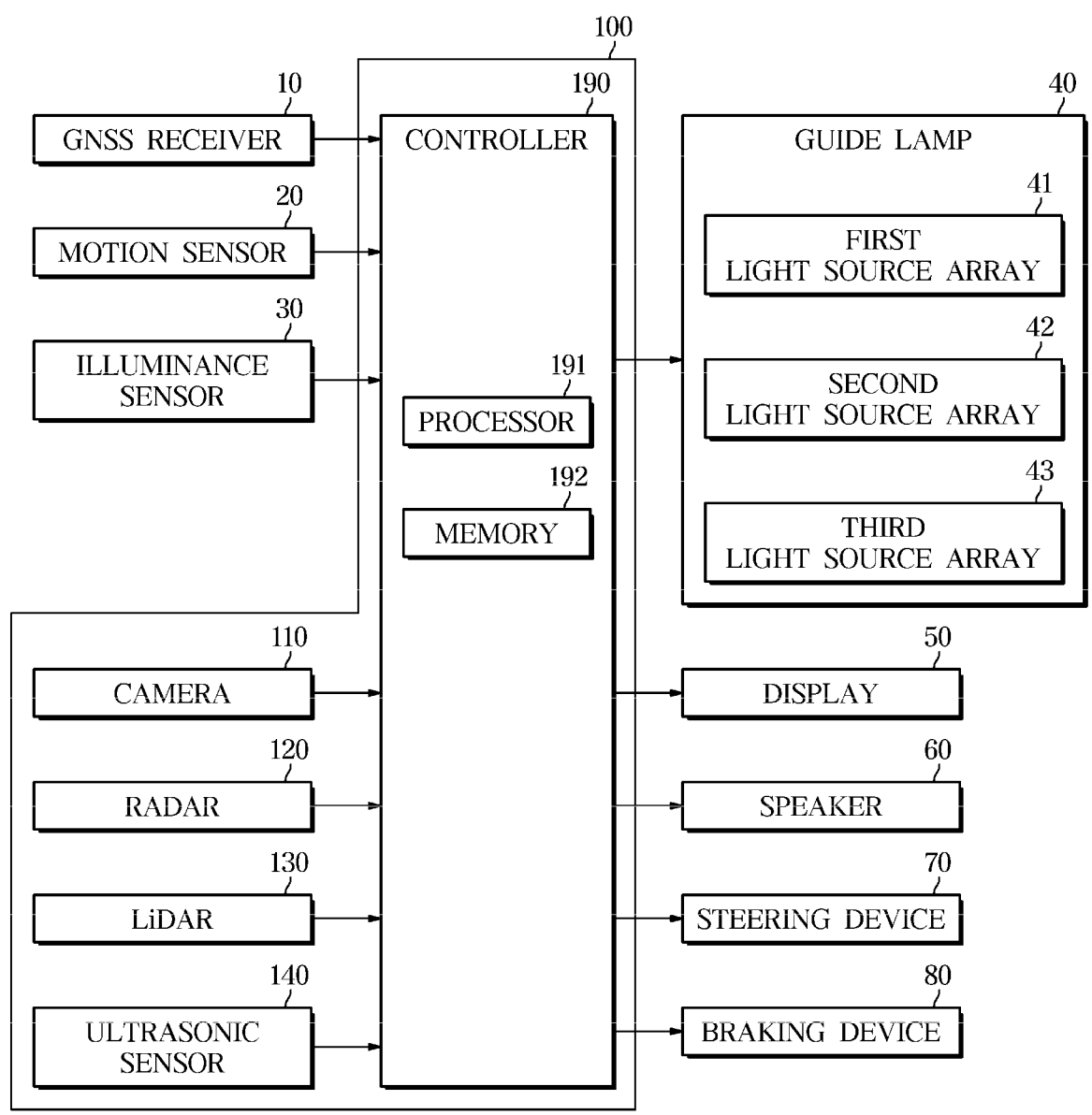
FIG. 1 is a view illustrating a configuration of a vehicle in one form of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the principles and embodiments of the disclosure will be described with reference to the accompanying drawings.

Figure 2:
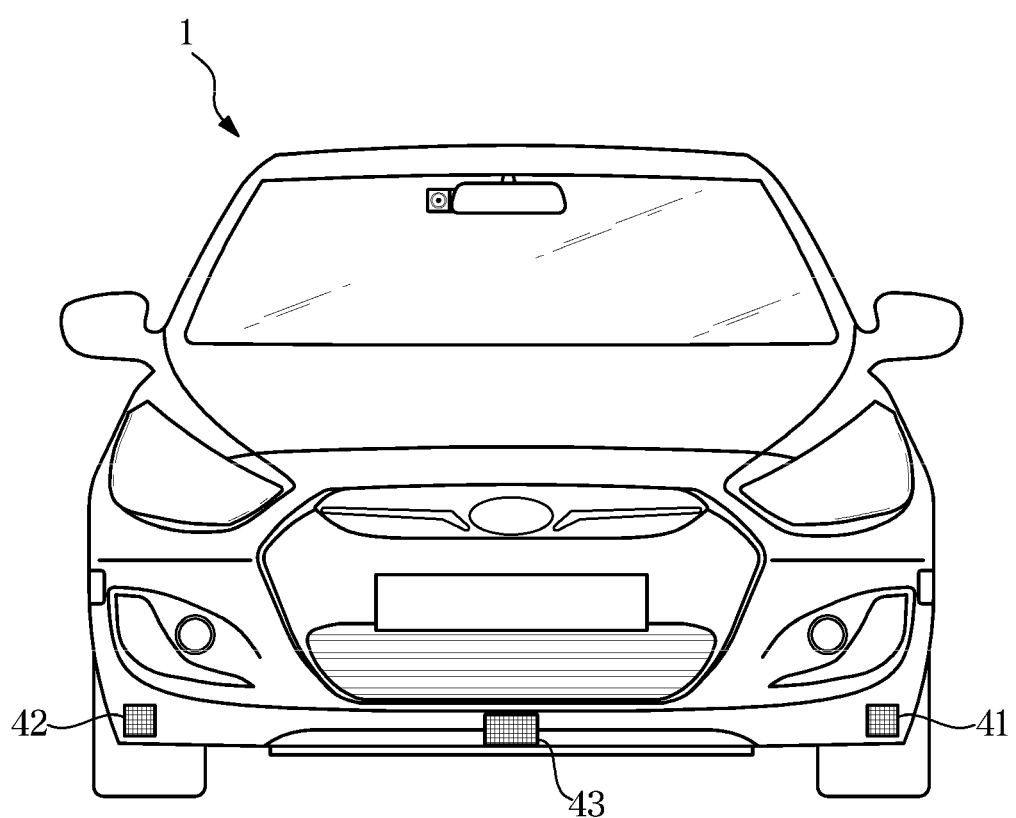
FIG. 2 is a view illustrating a guide lamp of a vehicle in one form of the present disclosure.
Figure 3:
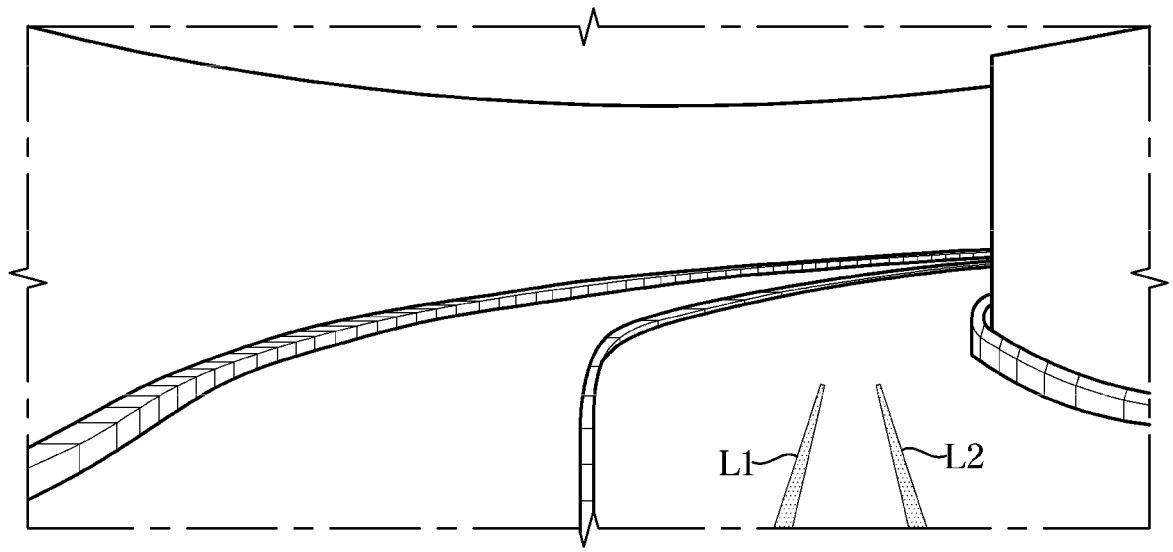
FIG. 3 is a view illustrating an example of an image captured by a camera included in a vehicle in one form of the present disclosure.
Figure 4:
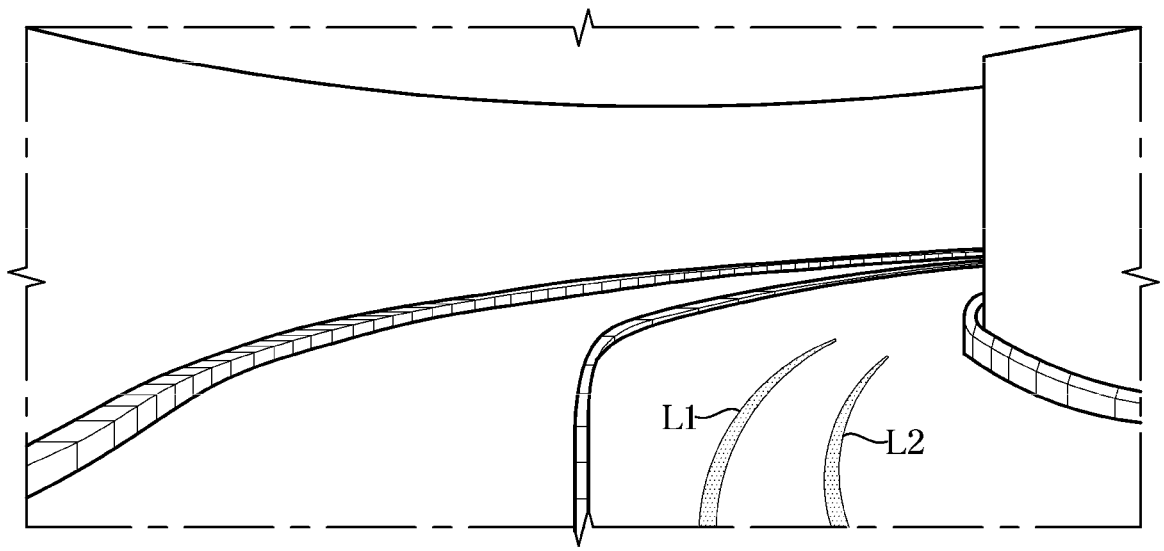
FIG. 4 is a view illustrating another example of an image captured by a camera included in a vehicle in one form of the present disclosure.
Figure 5:
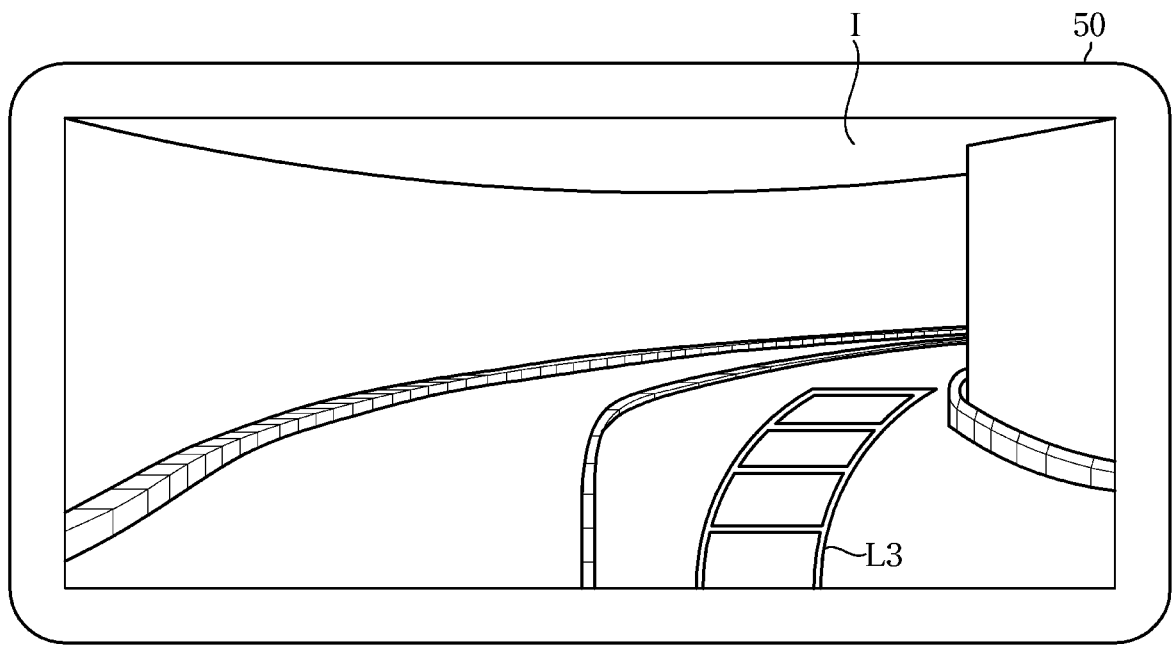
FIG. 5 is a view illustrating an example of an image displayed by a display included in a vehicle in one form of the present disclosure.
Figure 6:
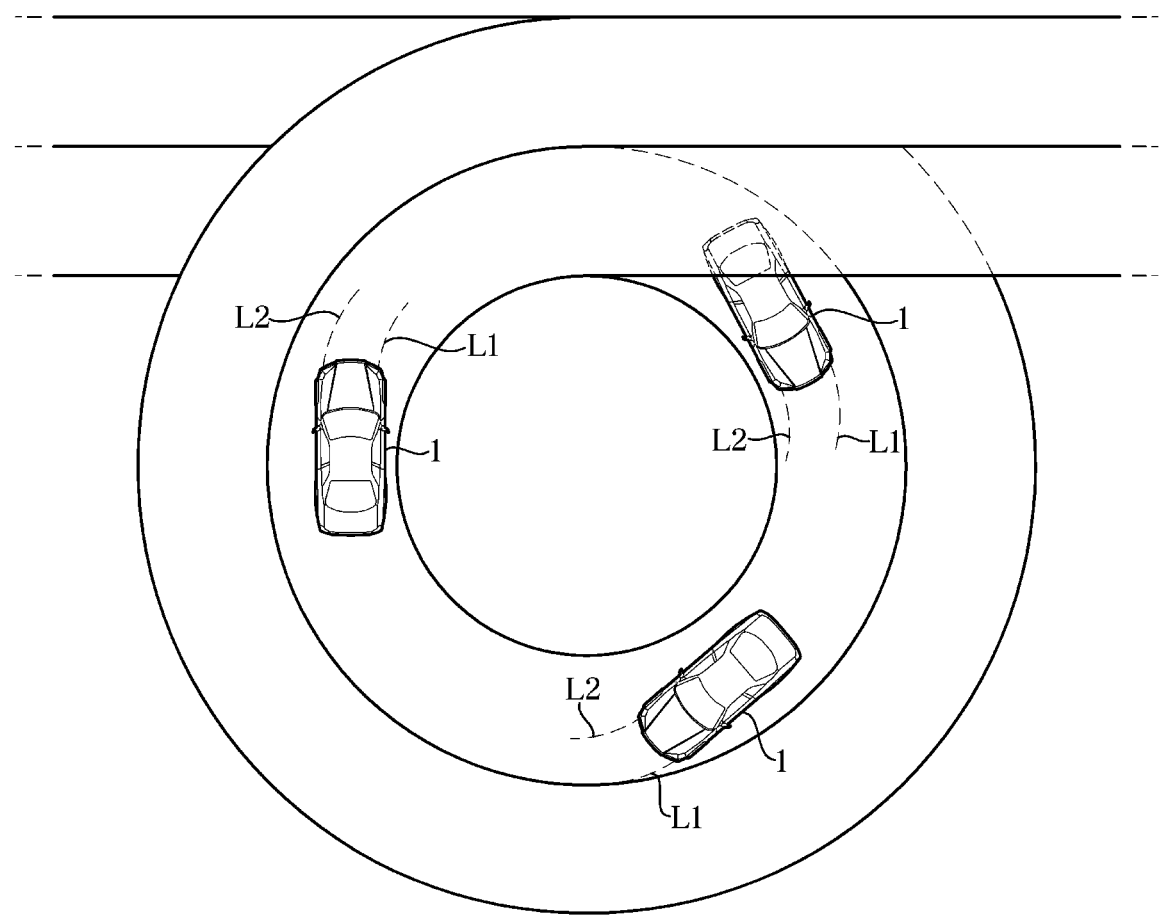
FIG. 6 is a view illustrating control of a light line to prevent a vehicle from colliding with an obstacle in one form of the present disclosure.
Figure 7:
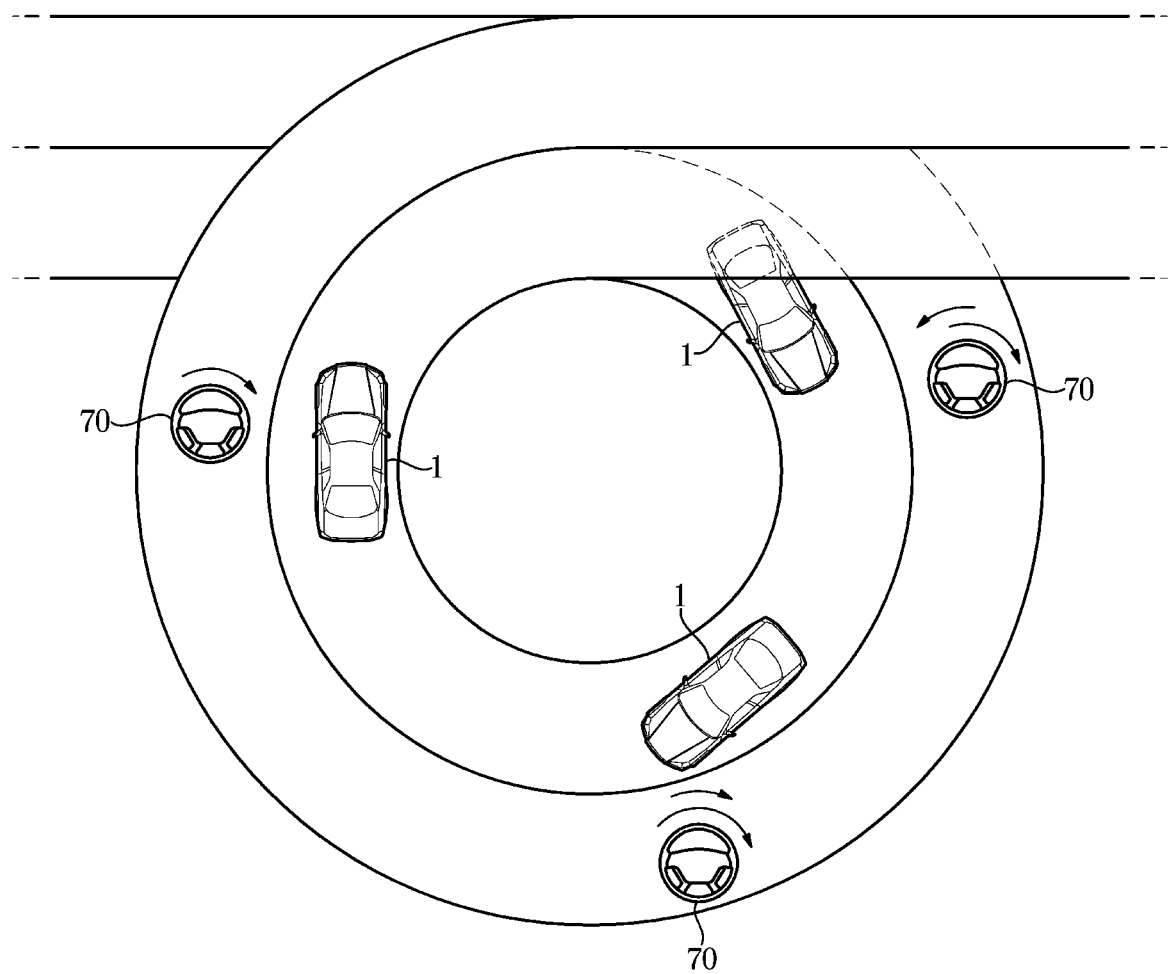
FIG. 7 is a view illustrating control of a travelling direction to prevent a vehicle from colliding with an obstacle in one form of the present disclosure.

FIG. 1 is a view illustrating a configuration of a vehicle according to an embodiment. FIG. 2 is a view illustrating a guide lamp of a vehicle according to an embodiment. FIG. 3 is a view illustrating an example of an image captured by a camera included in a vehicle according to an embodiment. FIG. 4 is a view illustrating another example of an image captured by a camera included in a vehicle according to an embodiment. FIG. 5 is a view illustrating an example of an image displayed by a display included in a vehicle according to an embodiment. FIG. 6 is a view illustrating control of a light line to prevent a vehicle from colliding with an obstacle according to an embodiment. FIG. 7 is a view illustrating control of a travelling direction to prevent a vehicle from colliding with an obstacle according to an embodiment.

A vehicle 1 includes a body that forms the external appearance of the vehicle 1 and accommodates a driver and/or luggage, a chassis that includes components of the vehicle 1 except for the body, and electronic components that provide convenience to a driver.

Referring to FIG. 1, the vehicle 1 may include a vehicle control device 100 that assists the driver or controls travel of the vehicle 1. In addition, the vehicle 1 includes a global navigation satellite system (GNSS) receiver 10, a motion sensor 20, an illuminance sensor 30, a guide lamp 40, a display 50, a speaker 60, a steering device 70, and a braking device 80.

The GNSS receiver 10 may receive a GNSS signal from a GNSS, and provide the received GNSS signal to the vehicle control device 100. The vehicle control device 100 may identify the position of the vehicle 1 based on the GNSS signal received from the GNSS receiver 10. The GNSS receiver 10 may be a part of an audio, video, navigation (AVN) device that displays a route to a destination input by the driver.

The motion sensor 20 may detect movement of the vehicle 1 including a linear acceleration and a rotational acceleration of the vehicle 1, and provide the vehicle control device 100 with an electrical signal corresponding to the movement of the vehicle 1. For example, the motion sensor 20 may detect vertical acceleration, longitudinal acceleration, and lateral acceleration of the vehicle 1 based on a change in gravitational acceleration acting on the vehicle 1. In addition, the motion sensor 20 may detect a yaw rate, a roll rate, and a pitch rate of the vehicle 1 using rotational inertia or Coriolis force.

The illuminance sensor 30 may output an electrical signal whose magnitude, frequency, or phase changes according to ambient brightness. The illuminance sensor 30 may output the electric signal corresponding to the ambient brightness to the vehicle control device 100. For example, the illuminance sensor 30 may include a cadmium sulfide (CdS) sensor whose electrical resistance value changes according to ambient brightness, or may include a photodiode device that outputs different voltages according to ambient brightness.

The guide lamp 40 may emit light onto a road on which the vehicle 1 is traveling. The guide lamp 40 may emit visible light toward a road ahead of the vehicle 1 based on the travelling direction of the vehicle 1. The visible light emitted by the guide lamp 40 may form a light line on the road ahead of the vehicle 1.

Referring to FIG. 2, the guide lamp 40 may include a first light source array 41 installed on a front left portion of the vehicle 1 to emit light toward a front lower side of the vehicle 1, a second light source array 42 installed on a front right portion of the vehicle 1 to emit light toward a front lower side of the vehicle 1, and a third light source array 43 installed on a front center portion of the vehicle 1 to emit light toward a front lower side of the vehicle 1.

The first, second, and third light source arrays 41, 42, and 43 each include a plurality of light sources (e.g., light emitting diodes or lasers) arranged in a two-dimension. Accordingly, the first, second, and third light source arrays 41, 42, and 43 may emit light toward the road ahead of the vehicle 1 such that light lines of various shapes, such as straight lines and curved lines, are formed on the road ahead of the vehicle 1.

Each of the first, second, and third light source arrays 41, 42, and 43 may include a red light source, a green light source, and a blue light source, and may emit light toward the road ahead of the vehicle such that light lines of various colors are formed.

The display 50 may display travelling information of the vehicle 1.

The display 50 may include a head-up display displaying an image on a cluster provided in front of a steering wheel of the vehicle 1 or on a windshield of the vehicle 1, and an AVN display installed on a center fascia of the vehicle 1.

The display 50 may include a touch panel for obtaining a driver's input. For example, the display 50 may display a plurality of buttons representing a control command selectable by the driver, and may identify the driver's control command according to a driver's touch input.

The speaker 60 may output sound based on sound data provided from the vehicle control device 100. For example, the speaker 60 may output sound by radio broadcasting or may output sound by reproduction of media. In addition, the speaker 60 may output a warning sound to call attention of the driver.

The steering device 70 may change the travelling direction of the vehicle 1. The steering device 70 enables the driver to easily change the travelling direction of the vehicle 1 in response to a steering intention of the driver through the steering wheel. For example, the steering device 70 may generate a steering torque that assists the driver in manipulating the steering wheel such that the driver may easily manipulate the steering wheel. In addition, the steering device 70 may change the travelling direction of the vehicle 1 in response to a steering signal of the vehicle control device 100 regardless of the steering intention of the driver. For example, when a collision with an obstacle is expected, the steering device 70 may change the travelling direction of the vehicle 1 in response to a steering signal for avoiding the obstacle.

The braking device 80 may stop the vehicle 1 from traveling. The braking device 80 may stop rotation of a wheel of the vehicle 1 in response to a braking intention of the driver through a brake pedal. In addition, the braking device 80 may stop the vehicle 1 in response to a braking signal from the vehicle control device 100 regardless of the driver's braking intention. For example, when a collision with an obstacle is expected, the braking device 80 may stop the vehicle 1 in response to a braking signal for avoiding a collision with the obstacle.

The vehicle control device 100 may be connected to the GNSS receiver 10, the motion sensor 20, the illuminance sensor 30, the guide lamp 40, the display 50, the speaker 60, the steering device 70, and the braking device 80 through a communication network or through a hard wire.

The vehicle control device 100 includes a camera 110, a radar 120, a LiDAR 130, an ultrasonic sensor 140, and a controller 190.

The camera 110 may have a field of view directed forward of the vehicle 1. The camera 110 may be installed, for example, on a front windshield of the vehicle 1. The camera 110 may include a plurality of lenses and an image sensor. The image sensor may include a plurality of photodiodes that convert light into electrical signals, and the plurality of photodiodes may be arranged in a two-dimensional matrix.

The camera 110 may photograph the front of the vehicle 1 and acquire image data regarding the front of the vehicle 1. The image data regarding the front of the vehicle 1 may include a position of another vehicle, a pedestrian, a cyclist, or a lane located in front of the vehicle 1. The camera 110 may provide the captured image data to the controller 130, and the controller 190 may acquire distance information and velocity information of a fixed object and/or a moving object based on the image data.

The radar 120 may have a field of sensing directed forward of the vehicle 1. The radar 120 may be installed, for example, on a grille or bumper of the vehicle 1. The radar 120 may include a transmission antenna (or a transmission antenna array) that radiates a sensing radio wave toward the front of the vehicle 1 and a reception antenna (or a reception antenna array) that receives a reflected radio wave reflected from an object.

The radar 120 may obtain radar data from the sensing radio wave transmitted by the transmission antenna and the reflected radio wave received by the reception antenna, and may provide the received radar data to the controller 190. The controller 190 may obtain distance information and velocity information of a fixed object and/or a moving object based on the radar data.

The LiDAR 130 may have a field of sensing directed forward of the vehicle or in all directions around the vehicle 1. The LiDAR 130 may be installed on a roof of the vehicle 1. For example, the LiDAR 130 may include a light emitting diode (LED) (or an LED array) that emits light, such as infrared light, and a photodiode (or a photo diode array) that receives infrared light reflected from an object. The LiDAR 130 may obtain LiDAR data from the light emitted by the light emitting diode and the light received by the photodiode, and may provide the obtained LiDAR data to the controller 190. The controller 190 may obtain distance information and velocity information of a fixed object and/or a moving object based on the LiDAR data.

The ultrasonic sensor 140 may have a field of sensing directed forward or backward of the vehicle 1. The ultrasonic sensor 140 may be installed, for example, on a grille or bumper of the vehicle 1. The ultrasonic sensor 140 may include an ultrasonic transducer that emits ultrasonic waves and receives ultrasonic waves reflected from an object. The ultrasonic sensor 140 may acquire ultrasonic data from the ultrasonic waves emitted by the ultrasonic transducer and the ultrasonic waves received by the ultrasonic transducer, and may provide the obtained ultrasonic data to the controller 190. The controller 190 may obtain distance information and velocity information of a fixed object and/or a moving object based on the ultrasonic data.

The controller 190 includes a processor 191 and a memory 192.

The processor 191 may process outputs of the GNSS receiver 10, the motion sensor 20, the illuminance sensor 30, the camera 110, the radar 120, and the ultrasonic sensor 140, and in response to the processing result, provide control signals and/or image data to the guide lamp 40, the display 50, the speaker 60, the steering device 70, and the braking device 80. For example, the processor 191 may include an image processor that processes image data, and/or a digital signal processor that processes radar data/LiDAR data/ultrasonic data, and/or a micro control unit (MCU) that generates a driving signal/braking signal/steering signal.

The memory 192 may store a program and/or data for processing image data by the processor 191, a program and/or data for processing sensing data by the processor 191, and a program and/or data for generating a driving signal and/or a braking signal and/or a steering signal by the processor 191. The memory 192 may include a volatile memory, such as an S-RAM, a D-RAM, and the like, and a non-volatile memory, such as a flash memory, a read only memory (ROM), an erasable programmable read only memory (EPROM), and the like.

As such, the controller 190 may control the guide lamp 40, the display 50, the speaker 60, the steering device 70, and the braking device 80 based on the outputs of the GNSS receiver 10, the motion sensor 20, the illuminance sensor 30, the camera 110, the radar 120, and the ultrasonic sensor 140.

The controller 190 may control the first light source array 41 to generate a first light line L1 representing a left boundary of the vehicle 1, and the first light source array 41 may emit visible light onto a road ahead of the vehicle 1. The controller 190 may control the second light source array 42 to generate a second light line L2 representing a right boundary of the vehicle 1, and the second light source array 42 may emit visible light onto the road ahead of the vehicle 1. The first light line L1 and the second light line L2 may be formed on the left and right front sides of the vehicle 1 as shown in FIG. 3.

For example, when the vehicle 1 travels in a straight line as shown in FIG. 3, the controller 190 may control the first light source array 41 and the second light source array 42 to form the first light line L1 and the second light line L2 in a straight line.

As another example, when the vehicle 1 travels in a curved line, the controller 190 may control the first light source array 41 and the second light source array 42 to form the first light line L1 and the second light line L2 in a curved line as shown in FIG. 4. In this case, the curvature of each of the first and second light lines L1 and L2 may depend on the travelling velocity of the vehicle 1 and the steering angle of the steering wheel. Accordingly, the first light line L1 and the second light line L2 may represent a path to be travelled on by the vehicle 1.

In addition, the controller 190 may control the first light source array 41 and the second light source array 42 such that various shapes, such as letters, numbers, and symbols, are formed.

As such, the first light line L1 and the second light line L2 may represent a path on which the vehicle 1 travels. In addition, the first light line L1 and the second light line L2 may represent an area occupied by the vehicle 1 on the path on which the vehicle 1 travels. Since the first light source array 41 is installed at the left end of the vehicle 1 and the second light source array 42 is installed at the right end of the vehicle 1, the distance between the light line L1 generated by the first light source array 41 and the second light line L2 generated by the second light source array 42 may be approximately the same as the width of the vehicle 1.

Accordingly, the driver may identify an area occupied by the vehicle 1 in the road while on the drive, from the first light line L1 and the second light line L2. In addition, the driver may predict whether the vehicle 1 is likely to collide with an obstacle, from the first light line L1 and the second light line L2. For example, when both the first light line L1 and the second light line L2 are located on the road, the vehicle 1 is predicted to travel without colliding with an obstacle. On the other hand, when the first light line L1 and the second light line L2 are formed on a curb of the road or a barrier of the road, the vehicle 1 is predetermined to collide with the curb of the road or the barrier of the road.

The controller 190 may control the first light source array 41 and the second light source array 42 to form the first light line L1 and/or the second light line L2 in a green color. Based on a collision between the vehicle 1 and the object being predicted to occur, the controller 190 may control the first light source array 41 and the second light source array 42 to form the first light line L1 and/or the second light line L2 partly in a yellow color. In addition, based on a collision between the vehicle 1 and the object predicted to be impending, the controller 190 may control the first light source array 41 and the second light source array 42 to form the first light line L1 and/or the second light line L2 partly in a red color.

The controller 190 may control the third light source array 43 to form a third light line representing a path on which the vehicle 1 travels. The third light line is formed in the front center of the vehicle 1 and may represent a path on which the vehicle 1 travels.

The controller 190 may turn on the first and second light source arrays 41 and 42 together with the third light source array 43, or may turn on the first and second light source arrays 41 and 42 with the third light source array 43 being turned off. In addition, the controller 190 may turn on the third light source array 43 with the first and second light source arrays 41 and 42 being turned off.

In addition, the controller 190 may control the display 50 to display a front image I of the vehicle 1 photographed by the camera 110 as shown in FIG. 5. In particular, the controller 190 may control the display 50 to display a guide line L3 on the front image I in addition to the front image I photographed by the camera 110. The guide line L3 may include a line in a longitudinal direction and a line in a transverse direction with respect to the travelling direction of the vehicle 1. In addition, the guide line L3 may represent a travelling direction of the vehicle 1 and an occupied area of the vehicle 1.

When the vehicle 1 travels in a straight line, the controller 190 may control the display 50 to display the guide line L3 in a straight line on the front image I photographed by the camera 110.

On the other hand, when the vehicle 1 travels in a curve line, the controller 190 may control the display 50 to display the guide line L3 in a curved line on the front image I. In this case, the curvature of the curved guide line L3 may depend on the travelling velocity of the vehicle 1 and the steering angle of the steering wheel. Accordingly, the guide line L3 may represent a path to be travelled on by the vehicle 1.

In addition, the controller 190 may control the display 50 to display a warning image to call attention of the driver.

The controller 190 may identify that the vehicle 1 enters the parking lot based on the outputs of the GNSS receiver 10, the illuminance sensor 30 and the camera 110.

For example, the controller 190 may identify that the vehicle 1 is located near a parking lot based on the GNSS signal of the GNSS receiver 10. When the reception of the GNSS signal is stopped while the vehicle 1 is located near the parking lot, the controller 190 may identify that the vehicle 1 has entered the parking lot.

In addition, when the external illumination based on the illumination sensor 30 is less than a reference illumination level while the vehicle 1 is located near the parking lot, the controller 190 may identify that the vehicle 1 has entered the parking lot. In addition, when an entrance to a parking lot is identified based on image data captured by the camera 110 while the vehicle 1 is located near the parking lot, the controller 190 may identify that the vehicle 1 has entered the parking lot.

The controller 190 may identify that the vehicle 1 has entered a curved road (a helical road) based on an image captured by the camera 110. For example, the controller 190 may identify that the vehicle 1 has entered a curved road (a helical road) based on an edge extracted from an image captured by the camera 110 and a change in contrast acquired from the captured image.

The controller 190 may control the guide lamp 40 to generate a light line based on the vehicle 1 identified as entering the parking lot.

For example, the controller 190 may control the first light source array 41 and the second light source array 42 to form a first light line L1 and a second light line L2 on the road ahead of the vehicle 1.

The controller 190 may process an image captured by the camera 110 to determine a curvature of a helical road (e.g., an access road of a parking lot) to be travelled on by the vehicle 1. The controller 190 may determine the travelling velocity of the vehicle 1 based on an output of a vehicle velocity sensor installed in an engine or transmission. The controller 190 may obtain a steering angle at which the driver manipulates the steering wheel from the steering device 70. In addition, the controller 190 may acquire physical quantities related to the movement of the vehicle 1 including the longitudinal velocity, the longitudinal acceleration, the lateral velocity, and the lateral acceleration of the vehicle 1 based on the output of the motion sensor 20.

The controller 190 may predict the travelling path of the vehicle 1 based on the curvature of the road, the travelling velocity of the vehicle 1, the steering angle of the vehicle 1, and the physical quantities related to the movement of the vehicle 1. The controller 190 may control the first light source array 41 and the second light source array 42 to form the first light line L1 and the second light line L2 according to the predicted travelling path. For example, the controller 190 may control the first light source array 41 and the second light source array 42 to display the first light line L1 and the second light line L2 representing a travelling path of the vehicle 1 and an occupied area of the vehicle 1 on the road in front of the vehicle 1.

The controller 190 may detect an object that is like to collide with the vehicle 1 while the vehicle 1 is traveling, and when a collision between the vehicle 1 and the object is predicted to occur, warn the driver of a collision or control the steering device 70 and/or the braking device 80 to avoid a collision.

The controller 190 may acquire the relative positions (distances and directions) of objects in front of the vehicle 1 based on the image data of the camera 110. The controller 190 may acquire the relative positions (distances and directions) and relative velocities of objects in front of the vehicle 1 based on the radar data of the radar 120, the LiDAR data of the LiDAR 130, or the ultrasonic data of the ultrasonic sensor 140. In addition, the controller 190 may match objects identified from the image data with objects identified from the radar data/rider data/ultrasonic data, and may identify a front object of the vehicle 1 based on a result of the matching, and acquire a relative position and a relative velocity of the front object.

The controller 190 may control the guide lamp 40, the steering device 70, and the braking device 80 based on the relative position and the relative velocity of the front object.

For example, the controller 190 may calculate the time to collision (TTC) between the vehicle 1 and the front object based on the relative position and relative velocity of the front object, and based on a result of the TTC compared with a reference time, warn the driver of a collision, change the travelling direction of the vehicle 1, or stop the vehicle 1.

The controller 190 may warn the driver of a collision with the front object based on the TTC being less than a first reference time. For example, the controller 190 may control the speaker 60 to output a first warning sound to call attention of the driver. In addition, the controller 190 may control the first light source array 41 and/or the second light source array 42 to form the first light line L1 and/or the second light line L2 in a yellow color. The controller 190 may control the first light source array 41 to form the first light line L1 in a yellow color based on a collision being predicted to occur on the left side of the vehicle 1. The controller 190 may control the second light source array 42 to form the second light line L2 in a yellow color based on a collision being predicted to occur on the right side of the vehicle 1.

The controller 190 may warn the driver that a collision with a front object is imminent and intervene in the traveling of the vehicle 1 based on the TTC being less than a second reference time that is less than the first reference time. For example, the controller 190 may control the speaker 60 to output a second warning sound to call attention of the driver. Referring to FIG. 6, the controller 190 may control the first light source array 41 and/or the second light source array 42 to form the first light line L1 and/or the second light line L2 in a red color. In addition, referring to FIG. 7, in order to avoid a collision, the controller 190 may control the steering device 70 to change the travelling direction of the vehicle 1 or control the braking device 80 to stop the travelling of the vehicle 1.

Whether the vehicle control device 100 intervenes in the travelling of the vehicle 1 may depend on a driver's setting. The driver may select whether the vehicle control device 100 intervenes in the travelling of the vehicle 1 using the display 50 capable of detecting the driver's touch. For example, the vehicle control device 100 may not intervene in the travelling of the vehicle 1 based on a manual mode selected by the driver through the display 50. In the manual mode, the controller 190 may only warn the driver of a collision with a front object. Further, the vehicle control device 100 may intervene in the travelling of the vehicle 1 based on an automatic mode being selected by the driver through the display 50. In the automatic mode, the vehicle control device 100 may control the steering device 70 and/or the braking device 80 to avoid a collision.

Figure 8:
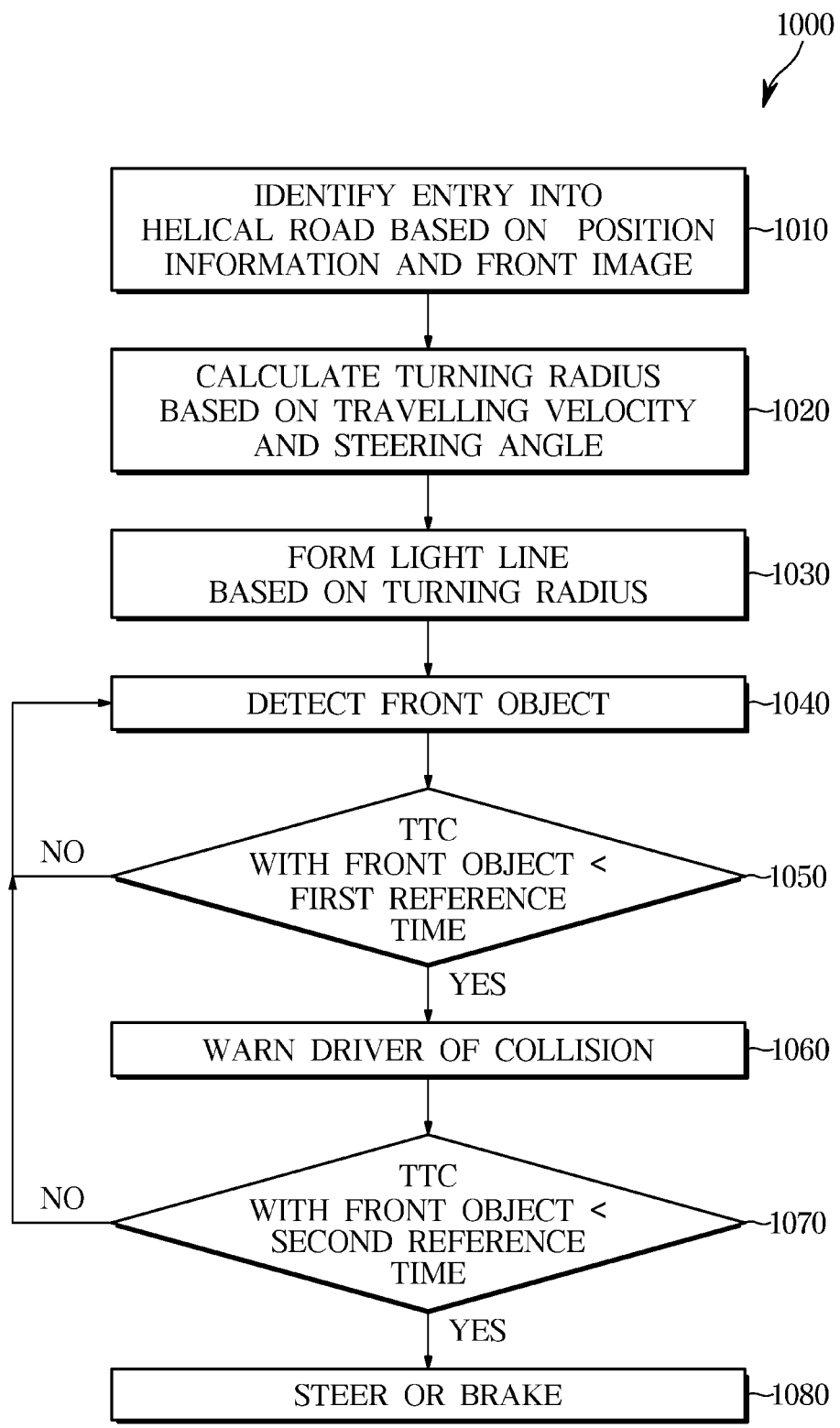
FIG. 8 is a view illustrating an example of a collision avoidance operation of a vehicle in one form of the present disclosure.

FIG. 8 is a view illustrating an example of a collision avoidance operation of a vehicle according to an embodiment.

Referring to FIG. 8, a collision avoidance operation 1000 of the vehicle 1 will be described.

The vehicle 1 identifies entry into a helical road based on position information and a front image (1010).

The vehicle control device 100 identifies that the vehicle 1 has entered the helical road based on position information of the vehicle 1 obtained from the GNSS receiver 10 and image data related to a front area in front of the vehicle 1 obtained from the camera 110.

The vehicle 1 calculates a turning radius based on a travelling velocity and a steering angle (1020).

The vehicle control device 100 may calculate the turning radius of the vehicle 1 based on the travelling velocity of the vehicle 1 obtained from the vehicle velocity sensor installed in the engine or the transmission, and the steering angle obtained from the steering device 70.

The vehicle 1 forms a light line in front of the vehicle 1 based on the turning radius (1030).

The vehicle control device 100 may control the first light source array 41 and the second light source array 42 to form a first light line L1 and a second light line L2 on the road ahead of the vehicle 1. The vehicle control device 100 may adjust the curvature (or curvature radius) of the first light line L1 and the second light line L2 based on the turning radius of the vehicle 1. Accordingly, the first light line L1 and the second light line L2 may represent the travelling path of the vehicle 1.

The vehicle 1 detects a front object located in front of the vehicle 1 (1040).

The vehicle control device 100 may detect the front object and identify the relative position and relative velocity of the front object, based on the image data of the camera 110 and/or the radar data of the radar 120 and/or the LiDAR data of the LiDAR 130 and/or the ultrasonic data of the ultrasonic sensor 140.

The vehicle 1 identifies whether a TTC with the front object is less than a first reference time (1050).

The vehicle control device 100 may identify the TTC between the vehicle 1 and the front object based on the relative position and the relative velocity of the front object, and identify whether the TTC is less than the first reference time.

When the TTC is not less than the first reference time (No in operation 1050), the vehicle 1 may detect the front object and re-identify whether the TTC is less than the first reference time.

When the TTC is less than the first reference time (YES in operation 1050), the vehicle 1 warns the driver of a collision (1060).

The vehicle control device 100 may control the display 50 to display a warning image for calling attention of the driver. In addition, the vehicle control device 100 may control the first light source array 41 and the second light source array 42 to form a first light line L1 and/or a second light line L2 in a yellow color to warn the driver of a collision with the front object.

The vehicle 1 identifies whether the TTC with the front object is less than a second reference time that is less than the first reference time (1070).

The vehicle control device 100 may compare the TTC with the second reference time and identify whether the TTC is less than the second reference time.

When the TTC is not less than the second reference time (No in operation 1070), the vehicle 1 detects the front object and re-determines whether the TTC with the front object is less than the first and second reference times.

When the TTC is less than the second reference time (YES in operation 1070), the vehicle 1 changes the travelling direction or stops (1080).

The vehicle control device 100 may control the steering device 70 to change the travelling direction of the vehicle 1 or control the braking device 80 to stop the travelling of the vehicle 1 in order to avoid a collision between the vehicle 1 and the front object.

Accordingly, the vehicle 1 may be prevented from a collision due to the driver's inexperience in travelling in a dark or narrow parking lot access road. In addition, the vehicle 1 may be prevented from a collision due to a driver's inexperience in travelling in a helical access road of a parking lot.

Figure 9:
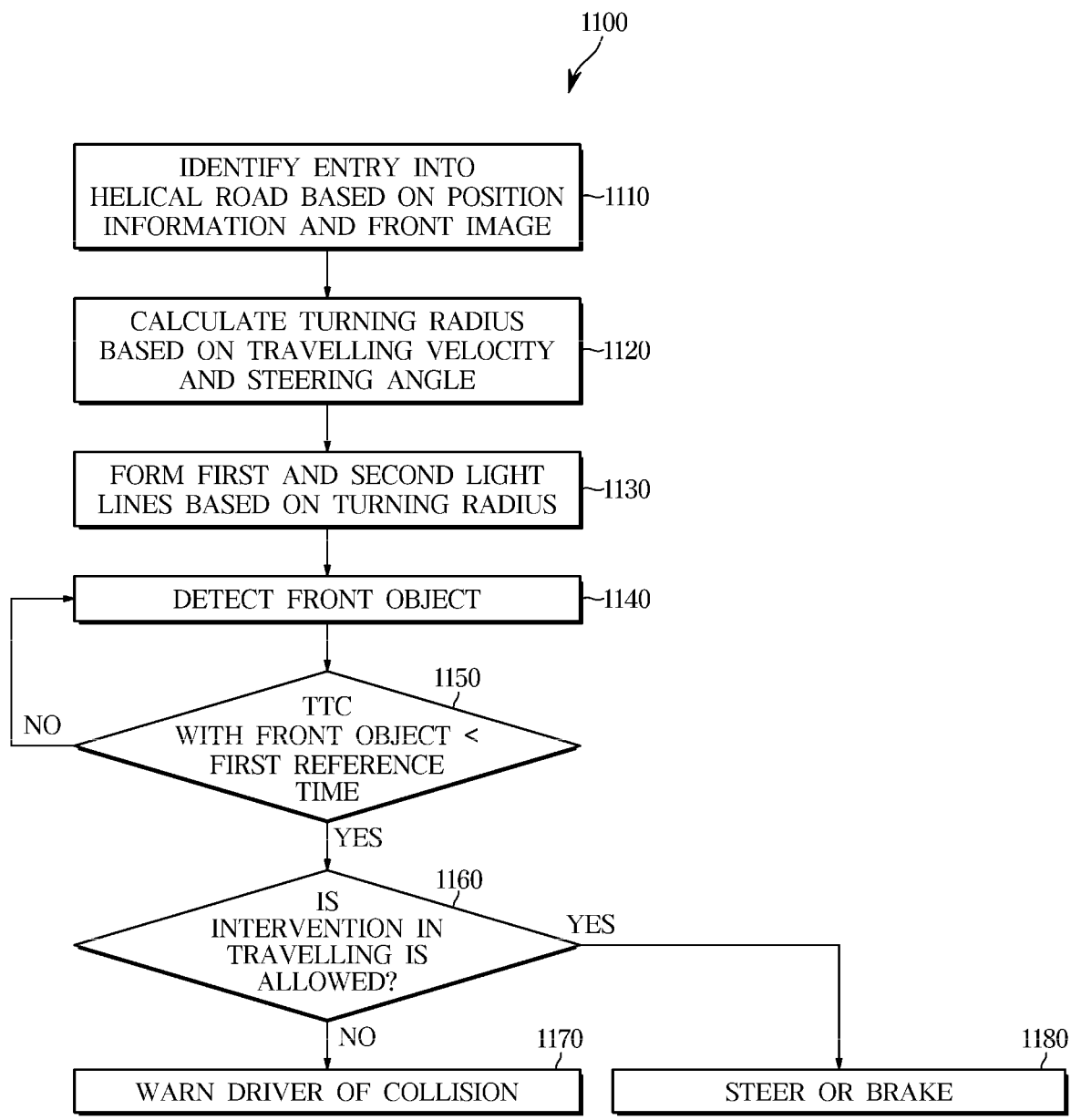
FIG. 9 is a view illustrating an example of a collision avoidance operation of a vehicle in one form of the present disclosure.

FIG. 9 is a view illustrating an example of a collision avoidance operation of a vehicle according to an embodiment.

Referring to FIG. 9, a collision avoidance operation 1100 of the vehicle 1 will be described.

The vehicle 1 identifies entry into a helical road based on position information and a front image (1110), calculates a turning radius based on the travelling velocity and steering angle (1120), forms light lines in front of the vehicle 1 based on the turning radius (1130), detects a front object in front of the vehicle (1140), and identifies whether a TTC with the front object is less than a first reference time (1150).

Operation 1110, operation 1120, operation 1130, operation 1140, and operation 1150 may be the same as operations 1010, 1020, 1030, 1040, and 1050 shown in FIG. 8, respectively.

When the TTC is less than the first reference time (YES in operation 1150), the vehicle 1 identifies whether the vehicle control device 100 is allowed to intervene in travelling of the vehicle 1 (1160).

Whether the vehicle control device 100 intervenes in the travelling of the vehicle 1 may depend on a driver's setting. The vehicle control device 100 may not intervene in the travelling of the vehicle 1 based on a manual mode being selected by the driver through the display 50, and may intervene in the travelling of the vehicle 1 based on an automatic mode being selected by the driver through the display 50.

When the intervention in the travelling of the vehicle 1 is not allowed (No in operation 1160), the vehicle 1 warns the driver of a collision (1170).

Operation 1170 may be the same as operation 1060 illustrated in FIG. 8.

When the intervention in the travelling of the vehicle 1 is allowed (YES in operation 1160), the vehicle 1 changes the travelling direction or stops (1180).

Operation 1180 may be the same as operation 1080 illustrated in FIG. 8.

Accordingly, the vehicle 1 may be prevented from a collision due to the driver's inexperience in travelling in a dark or narrow parking lot access road. In addition, the vehicle 1 may be prevented from a collision due to the driver's inexperience in travelling in a helical access road of a parking lot.

As is apparent from the above, the vehicle and the method of controlling same can prevent a collision in a dark or narrow parking lot access road.

The vehicle and the method of controlling same can prevent a collision in a helical access road of a parking lot.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle comprising:
    a global navigation satellite system (GNSS) receiver configured to receive a signal from a GNSS;
    a guide lamp installed on a front portion of the vehicle; and
    a controller electrically connected to the GNSS receiver and the guide lamp,
    wherein the controller is configured to:
        identify an entry of the vehicle into a parking lot based on a GNSS signal acquired by the GNSS receiver; and
        control the guide lamp to display, on a road, a light line representing a path to be travelled on by the vehicle and an area to be occupied by the vehicle on the road ahead of the vehicle based on the entry of the vehicle into the parking lot; and
    wherein the guide lamp includes:
        a first light source array including a plurality of light sources two-dimensionally arranged and installed on a front left portion of the vehicle to form a first light line on a front left side of the vehicle;
        a second light source array including a plurality of light sources two-dimensionally arranged and installed on a front right portion of the vehicle to form a second light line on a front right side of the vehicle; and
        a third light source array including a plurality of light sources two-dimensionally arranged and installed on a front center portion of the vehicle to form a third light line representing a path on which the vehicle travels.

2. The vehicle of claim 1, wherein the controller is configured to:
control the first light source array and the second light source array to form the first light line and the second light line having a curvature according to a travelling velocity of the vehicle and a steering angle of the vehicle, based on the entry of the vehicle into the parking lot.

3. The vehicle of claim 1, further comprising:
a camera having a field of view directed forward of the vehicle; and
a display configured to display a front image of an area in front of the vehicle captured by the camera,
wherein the controller is configured to control the display to display a guide line representing a path to be travelled on by the vehicle and an area to be occupied by the vehicle on the front image.

4. The vehicle of claim 1, further comprising:
a radar having a field of sensing directed forward of the vehicle and configured to output radar data,
wherein the controller is configured to identify a time to collision between an object located in front of the vehicle and the vehicle, based on the radar data.

5. The vehicle of claim 4, wherein the controller is configured to:
control the guide lamp to change a color of the light line, based on the time to collision that is less than a reference time.

6. The vehicle of claim 5, wherein the guide lamp includes:
a first light source array configured to form a first light line on a front left side of the vehicle; and
a second light source array configured to form a second light line on a front right side of the vehicle,
wherein the controller is configured to control the first light source array and the second light source array to form the first light line and second light line in a yellow or red color, based on the time to collision that is less than the reference time.

7. The vehicle of claim 4, wherein the controller is configured to:
control at least one of a steering device of the vehicle or a braking device of the vehicle to avoid a collision between the object located in front of the vehicle and the vehicle, based on the time to collision that is less than a reference time.

8. The vehicle of claim 4, wherein the controller, based on the time to collision that is less than a reference time, is configured to:
control the guide lamp to change a color of the light line in a first mode; and
control at least one of a steering device of the vehicle or a braking device of the vehicle to avoid a collision between the object located in front of the vehicle and the vehicle in a second mode.

9. The vehicle of claim 1, further comprising:
a camera having a field of view directed forward of the vehicle and configured to output image data,
wherein the controller is configured to:
identify that the vehicle enters a curved road based on the image data; and
control the guide lamp to display a light line representing a path to be travelled by the vehicle and an area to be occupied by the vehicle on a road ahead of the vehicle, based on the entry of the vehicle into the curved road.

10. A vehicle comprising:
a camera having a field of view directed forward of the vehicle, and configured to output image data;
a guide lamp installed on a front portion of the vehicle; and
a controller electrically connected to the camera and the guide lamp,
wherein the controller is configured to:
identify entry of the vehicle into a curved road based on the image data; and
control the guide lamp to display, on a road, a light line representing a path to be travelled by the vehicle and an area to be occupied by the vehicle on the road ahead of the vehicle based on the entry of the vehicle into the curved road;
wherein the guide lamp includes:
a first light source array including a plurality of light sources two-dimensionally arranged and installed on a front left portion of the vehicle to form a first light line on a front left side of the vehicle;
a second light source array including a plurality of light sources two-dimensionally arranged and installed on a front right portion of the vehicle to form a second light line on a front right side of the vehicle; and
a third light source array including a plurality of light sources two-dimensionally arranged and installed on a front center portion of the vehicle to form a third light line representing a path on which the vehicle travels.

11. The vehicle of claim 10, wherein the controller is configured to:
control the first light source array and the second light source array to form the first light line and the second light line having a curvature according to a travelling velocity of the vehicle and a steering angle of the vehicle, based on the entry of the vehicle into the curved road.

12. The vehicle of claim 10, further comprising:
a radar having a field of sensing directed forward of the vehicle and configured to output radar data,
wherein the controller is configured to identify a time to collision between an object located in front of the vehicle and the vehicle, based on the radar data.

13. The vehicle of claim 12, wherein the controller, based on the time to collision that is less than a reference time is configured to:
control the guide lamp to change a color of the light line in a first mode; and
control at least one of a steering device of the vehicle or a braking device of the vehicle to avoid a collision between the object located in front of the vehicle and the vehicle in a second mode.

14. A method of controlling a vehicle, the method comprising:
identifying, by a controller, an entry of the vehicle into a parking lot or a curved road based on position information of the vehicle or a front image of an area in front of the vehicle; and
displaying, by a guide lamp, on a road, a light line representing a path to be travelled by the vehicle and an area to be occupied by the vehicle on the road ahead of the vehicle based on the entry of the vehicle into the parking lot or the curved road;

wherein the guide lamp includes:
a first light source array including a plurality of light sources two-dimensionally arranged and installed on a front left portion of the vehicle to form a first light line on a front left side of the vehicle;
a second light source array including a plurality of light sources two-dimensionally arranged and installed on a front right portion of the vehicle to form a second light line on a front right side of the vehicle; and
a third light source array including a plurality of light sources two-dimensionally arranged and installed on a front center portion of the vehicle to form a third light line representing a path on which the vehicle travels.

15. The method of claim 14, wherein the displaying of the light line includes:
forming the first light line and the second light line having a curvature according to a travelling velocity of the vehicle and a steering angle of the vehicle, based on the entry of the vehicle into the parking lot or the curved road.

16. The method of claim 14, further comprising:
displaying a guide line representing a path to be travelled by the vehicle and an area to be occupied by the vehicle on the front image.

17. The method of claim 14, further comprising:
identifying a time to collision between an object located in front of the vehicle and the vehicle based on radar data.

18. The method of claim 17, further comprising:
based on the time to collision that is less than a reference time, changing a color of the light line in a first mode and avoiding a collision between the object located in front of the vehicle and the vehicle in a second mode.

19. The vehicle of claim 12, wherein the controller is configured to:
control the guide lamp to change a color of the light line, based on the time to collision that is less than a reference time.

20. The vehicle of claim 12, wherein the controller is configured to:
control at least one of a steering device of the vehicle or a braking device of the vehicle to avoid a collision between the object located in front of the vehicle and the vehicle, based on the time to collision that is less than a reference time.

\* \* \* \* \*